(12) United States Patent
Morris (10) Patent No.: US 10,542,729 B2
(45) Date of Patent: Jan. 28, 2020

(54) NON-SLIP THERAPEUTIC DOG BOOTS (71) Applicant: Beth Morris, Loisville, TN (US)

(72) Inventor: Beth Morris, Loisville, TN (US)

( * ) Notice: Subject to any disclaimer, the term of this patent is extended or adjusted under 35 U.S.C. 154(b) by 512 days.

(21) Appl. No.: 14/120,609

(22) Filed: Jun. 9, 2014

(65) Prior Publication Data

US 2014/0360053 A1 Dec. 11, 2014

Related U.S. Application Data

(60) Provisional application No. 61/956,508, filed on Jun. 10, 2013.

(51) Int. Cl.
*A01K 13/00* (2006.01)
*A43B 3/20* (2006.01)
*A43B 17/16* (2006.01)

(52) U.S. Cl.
CPC .......... *A01K 13/007* (2013.01); *A01K 13/006* (2013.01); *A43B 3/20* (2013.01); *A43B 17/16* (2013.01)

(58) Field of Classification Search
CPC ...... A01K 13/006; A01K 13/007; A43B 3/20; A43B 17/17
USPC .............. 36/111, 7.2, 7.4, 7.7, 72 R, 77 R
See application file for complete search history.

(56) References Cited

U.S. PATENT DOCUMENTS

| | | | | |
|---|---|---|---|---|
| 3,747,565 A | * | 7/1973 | Kellam | A01K 13/001 36/111 |
| 6,186,097 B1 | * | 2/2001 | Brockmann | A01K 13/007 119/850 |
| 6,470,832 B1 | * | 10/2002 | Peacock | A01K 13/007 119/850 |
| 8,448,610 B1 | * | 5/2013 | Zeitler | A01K 13/007 119/850 |
| 2005/0092260 A1 | * | 5/2005 | Paxton | A01K 13/006 119/850 |
| 2006/0037561 A1 | * | 2/2006 | Fine | A01K 13/007 119/850 |
| 2007/0044734 A1 | * | 3/2007 | Maloney | A01K 13/007 119/850 |
| 2009/0094864 A1 | * | 4/2009 | Ketzenberg | A61D 9/00 36/111 |
| 2009/0229538 A1 | * | 9/2009 | Friedland | A01K 13/007 119/850 |
| 2014/0150299 A1 | * | 6/2014 | Entler | A01K 13/007 36/111 |
| 2015/0053148 A1 | * | 2/2015 | Huang | A01K 13/007 119/850 |

* cited by examiner

*Primary Examiner* — Alissa J Tompkins
*Assistant Examiner* — Cameron A Carter
(74) *Attorney, Agent, or Firm* — Van R. Irion (57) ABSTRACT

A product for therapeutic, non-slip animal boots. The product includes boots of various materials molded into grids and shaped to cover an animal's paws, and a means of securing the boots to the animal's paws.

7 Claims, 6 Drawing Sheets

FIG.1
(top view)

FIG.2
(bottom view)

FIG. 3
(side view)

Side View

Toe View

FIG. 4
(toe view)

NON-SLIP THERAPEUTIC DOG BOOTS

CLAIM OF PRIORITY

This is a Non-Provisional Patent Application filed for the invention by Beth Morris of 4260 Gravelly Hills Road, Louisville, Tenn. 37777, for new and useful "Non-Slip Therapeutic Dog Boots."

The applicant claims for this application the priority date established by provisional patent application 61/956,508, filed on Jun. 10, 2013.

FIELD OF THE INVENTION

The invention relates to a pet boot; and more particularly to a pet boot having therapeutic properties provided by increased traction on slippery surfaces and easier control of bodily movements, while maintaining tactile sensitivity between pet paw and walking surface.

BACKGROUND OF THE INVENTION

Several disorders exist that can cause the simple act of walking to be painful and difficult for dogs suffering these disorders. Wobblers Syndrome, arthritis, and hip dysplasia are examples of such disorders.

Wobblers Syndrome is a serious and progressive condition in which an abnormality in the spine pinches the spinal cord. Also known as cervical vertebral instability (CVI), and alternatively spondylolithesis, Wobblers Syndrome is a condition that can affect puppies or adult dogs. Sufferers of this syndrome develop an unsteady gait due to spinal cord compression caused by the narrowing of the vertebral canal, or by a ruptured disc in the neck. This causes the vertebral ligaments to become loosened and overstretched (hypertrophy) to the point of an inability to tauten properly when strength is needed. The vertebrae can become malformed, or do not come together properly, which puts pressure on the spinal cord causing gait problems and moderate to severe discomfort.

Current treatment for dogs suffering from Wobblers Syndrome and similar disorders includes minimizing movement of the animal and providing an environment that requires less effort from the animal in order to walk. Flat, soft surfaces with few obstacles are preferred.

It is understood that dogs with walking disorders have more difficulty walking on slippery surfaces such as hardwood floors and tile. Also, it is understood that as they age otherwise healthy dogs have difficulty walking on hard slippery surfaces due to muscle atrophy (loss of muscle tissue due to malnutrition, less exercise, etc.) and stretched ligaments and tendons. Decreased traction on such surface's force the animal to use more muscles and expend more energy in order to keep their feet from slipping out from under the animal. Such increased efforts, while hardly noticed by healthy dogs, make walking difficult and painful for older dogs and dogs suffering from Wobblers Syndrome and similar disorders. Also, because dogs suffering from Wobblers Syndrome and similar disorders are sensitive to impact with hard surfaces, simply walking on surfaces such as concrete, rocks, asphalt, tile, and hardwood floors can cause pain, bruising, and foot-pad injury.

Therefore, increasing traction between the bottom of the dog's feet and the surface being walked upon is desirable. Also, cushioning the impact between foot and floor is desirable. Also, a boot that maintains a flat surface under the animal's foot-pads is desirable. The instant invention improves upon current art with respect to all of these issues.

While prior art has addressed shoes and/or boots for animals for wear outside during inclement or cold weather, as well as for aesthetic purposes, and to facilitate healing of an injured paw, no boot or shoe has been proposed that provides the therapeutic properties disclosed by the instant invention. While currently available shoes and/boots prevent animals from reinjuring paws and legs after treatment by covering said appendages during healing, such art does not provide the therapeutic properties related to chronic disorders, as disclosed by the instant invention.

Additionally, because dogs rely upon tactile feedback from their paws in order to maximize balance and efficiency of movement while walking and running, it is desirable that shoes and/or boots for animals minimize interference between the animal's paw and the ground. Pet boots currently available in the art significantly decrease tactile feedback between the pet's foot and the ground.

Also, pet boots currently available in the art provide coverings that minimize or eliminate airflow around the pet's paws. While such boots prevent water and other environmental debris from contacting the paw, such boots also retain any water and debris that may be on the paw when the boots are placed on the animal. Because dogs regulate their body heat in part by sweating through the surface of their paw pads, boots that do not allow sufficient air flow result in moisture build up around the paw. Moisture and dirt inside a pet boot can cause discomfort to the animal, and may lead to bacterial infection, mold, or other problems. Improving air flow would allow the animal to comfortably wear a boot longer, thereby minimizing disturbance to the dog. It is, therefore, desirable for pet boots to maximize air flow around the paws, allowing moisture to escape and debris to naturally dislodge.

It is also desirable to provide a pet boot that allows easy inspection of the animal's foot without removing the boot. Prior art animal boots do not allow easy inspection of the animal's foot without removing the boot.

Finally, it is well understood by all pet owners that most animals initially resist having boots placed on their feet, and attempt to remove such boots once the boots are secured to the animal's feet. While prior art addresses these issues in various ways, it is clear that improved designs for increasing ease of placing boots on the animal's feet and increasing security of the boots once in place, are desirable.

In contrast to the efforts of prior art workers which heretofore have simply constructed pet boots and shoes to be worn by a pet to prevent injury, aid healing, or prevent the animal from clawing furniture, there is a need in the art for a therapeutic pet boot appointed to be worn by a pet with a chronic walking disability. There remains a need in the art for a therapeutic pet boot that provides increased traction, shock absorption, increased tactile sensation, breathability, increased ability to visually inspect the animal's foot while the boot is on, and improves ease of placing the boot on the animal.

SUMMARY OF THE INVENTION

The present invention provides a therapeutic pet boot. More specifically, the present invention discloses a new product for therapeutically increasing traction, providing shock absorption, increasing tactile sensation, increasing breathability, increased ability to visually inspect the animal's foot while the boot is on, and improving ease of placing the boot on the animal.

The primary aspect of the present invention is to provide a boot to increase the coefficient of friction between the bottom of a dog's paws and the surface upon which the dog walks.

Another aspect of the present invention is to provide a boot that absorbs part of the shock incurred upon the dog's body as it walks.

Another aspect of the present invention is to provide an animal boot that minimally interferes with the tactile interaction between the animal's foot and the ground.

Another aspect of the present invention is to provide a boot that is easy to take on and off the animal.

Another aspect of the present invention is to provide a boot that provides plenty of airflow for the comfort and foot health of the animal.

Another aspect of the present invention is to provide a boot that increases ability to visually inspect the animal's foot while the boot is on.

Another aspect of the present invention is to provide a boot that securely attaches to the animal.

Another aspect of the present invention is to provide an overboot that easily fits over the first boot, securely attaches to the animal, temporarily protects the first boot from abrasion, and protects the animal's paw from environmental extremes.

Other aspects of this invention will appear from the following description and appended claims, reference being made to the accompanying drawings forming a part of this specification wherein like reference characters designate corresponding parts in the several views.

An animal boot is provided comprising strands of Liquid Silicone Rubber (LSR) or similar flexible material manufactured laid out in parallel and at right angles to create a grid of approximately one sixteenth inch average diameter. A cross section of the LSR strands reveals an oval shape to provide increased comfort for the animal. The LSR strands are provided with the widest portion of their cross section in a horizontal position. The grid consists of multiple rectangle-shaped spaces. Each such spaces are approximately one quarter inch wide by three eighths inches long. To be clear, the spaces between the strands of LSR do not create a solid surface across the grid cells. Instead, the cells are open to allow air flow through the LSR-strand grid.

A bottom portion of the boot consists of a section of LSR-strand grid, the bottom portion of the boot being rectangular at one end and semi-circular at the other end. The flat end at the rectangular end of the bottom portion is the rear of the boot. The bottom portion of the boot is approximately five and one half inches long, oriented with the shorter spaces between LSR-strand grids facing either side of the bottom of the boot.

A top portion of the boot consists of a section of LSR-strand grids, cut in the same shape as the bottom portion and oriented in the same manner as the bottom portion of the boot, and connected to the bottom portion of the boot along the edge of both top and bottom. The semi-circular end of the attached top and bottom portions is the front of the boot. The top and bottom portions of the boot are not attached at the rear end of the boot, thereby leaving an opening for the animal's paw to enter the boot.

The top portion of the boot is approximately one and one half inches shorter than the bottom portion, thereby leaving a one and one half inch section of the bottom portion exposed at the rectangular end of the boot after the top portion is attached to the bottom.

The rear end of the boot has a strap attached to it for tightening the boot around the leg of the animal. A section of hook and loop fastener is attached at one end of the strap to allow for tightening of the boot around the animal's ankle at the rear of the boot. The strap is approximately ten inches in length and is attached to the rear end of the boot at the bottom on one side of the boot. After the animal's paw is placed in the boot the strap is wrapped around the top of the animal's ankle and underneath the rear end of the boot in order to secure the boot on the animal's paw. Another section of hook and loop fastener is attached to the bottom of the rear end of the boot to provide secure attachment of the strap to the bottom of the rear end of the boot. It is understood that for the purposes of this specification the term "the animal's ankle" means the joint distal to the wrist just above the forefoot on the front legs of the animal and also means the joint distal to the hock just above the animal's hind feet.

In alternate embodiments the strands of Liquid Silicone Rubber (LSR) or similar flexible material laid out in parallel and at right angles to each other, are oriented at an angle to the rear of the boot to create a grid of diamond shaped squares or rectangles.

In alternate embodiments all dimensions of the boot are increased or decreased to accommodate animals with larger or smaller paws. For example, smaller dogs will benefit from thinner LSR strands and closer spacing of strands, resulting in smaller openings in the LSR grid. Whereas larger dogs will require thicker strands with wider spaced grids.

In an alternate embodiment the boot is secured to the animal's foot by alternate means. In this embodiment the strap is not part of the invention. The bottom portion of the boot is extended to equal the length of the top portion. The top and bottom portions are not connected at the side rear 1-inch portions, providing a slit on both sides to facilitate insertion of the animal's paw into the boot. A loosely woven (breathable), stretchy material or fabric collar is fused onto each of the rear 1-inch sections of the top and bottom boot portions. At one side of the bottom rear of the boot near the slit a length of hook fastener, enough to fully reach around to the back of the bottom of the boot, is fused or sewn to the boot. Along the length of the rear portion of the top portion of the boot and along the length of the rear of the bottom portion of the boot, a length of loop fastener is attached. The hook fastener on the strap aligns with the loop fasteners when the strap is wrapped around the animal's ankle for securing at the back of the animal's ankle.

In another alternative embodiment an elastic cord with cord lock is encased inside the fused collar, said elastic cord protruding from the collar at one side where it extends outside the collar openings, allowing the boot to be tightened onto the foot.

In an alternate embodiment high-tensile strength threads of approximately one sixteenth inch average diameter woven into a mesh and covered with Liquid Silicone Rubber (LSR) or similar flexible material. A cross section of the threads reveals an oval shape to provide increased comfort for the animal. The threads are woven with the widest portion of their cross section in a horizontal position and the LSR is deposited on the threads in a manner that leaves a grid of LSR-covered threads. The grid creates multiple rectangle-shaped empty spaces between the LSR-covered threads. Each such space is approximately one quarter inch wide by three eighths inches long. While the LSR covers the woven threads, LSR does not create a solid surface across the cells between the woven threads. The cells are open to allow air flow through the LSR-covered woven threads. In this embodiment the thread-covered LSR, and the grid created by the thread-covered LSR, comprise the material used to form the top and bottom of the boot.

In another alternate embodiment the woven threads are not woven, but are instead laid out across each other in a pattern creating square or rectangular cells.

In other alternate embodiments other elastomer materials are used in place of LSR. Molding or injection molding, or extrusion, or hand sewn and glued manufacturing methods may be used to create the top and bottom portions of the boot. Elastomers may include, but are not limited to saturated rubbers, unsaturated rubbers, thermoplastic elastomers, resilin and related elastomeric proteins, elastin and related elastic fibers, polysulfide rubber, latex, nylon, elastic fiber (such as elastolefin), and other flexible semi-rigid materials. Unsaturated rubbers may include, but are not limited to, natural polyisoprene, synthetic polyisoprene, chloroprene rubber (such as Neoprene), butyl rubber (such as halogenated and bromo), and nitrile rubber. Saturated rubbers may include, but are not limited to ethylene propylene rubber, ethylene propylene diene rubber, silicone rubber, fluorosilicone rubber, fluoroelastomers, chlorosulofonated polyethylene, and perfluoroelastomers.

In yet other alternate embodiments urethane materials are used in place of LSR. Molding or reaction injection molding manufacturing methods may be used to create the top and bottom portions of the boot, as well as the strap portion of the boot. Urathanes include, but are not limited to polyurethane and viscoelastic urethane polymer.

In other alternate embodiments aromatic polyamides, such as Kevlar or Nomex may be used to form the boot using sewing or adhesives or in combination.

In other alternate embodiments leather, tanned or rawhide, with or without puffy fabric paint may be used to form the boot. Hand sewn and glued manufacturing methods may be used.

In other alternate embodiments elastomeric plastic netting may be used to form the boot and may be hand sewn or manufactured via extrusion methods.

In other alternate embodiments flexible filaments may be used to form the boot and may be manufactured via extrusion, 3-dimensional printing, or additive manufacturing.

In other alternate embodiments nylons (polyamides) may be used to form the boot using molding, or extrusion, or 3-dimensional printing manufacturing methods.

In yet other alternate embodiments alternate means of securing the boot to the animal's paw are used. In one alternate embodiment elastic cords and cord locks are utilized in place of the hook and loop fasteners to secure the rear of the boot to the animal's ankle. In another embodiment rigid cordage is utilized to secure the rear of the boot to the animal's ankle.

In a preferred embodiment an extra-large animal boot is provided comprising a bottom portion of LSR strands of approximately $\frac{1}{8}^{th}$ (one-eighth) inch diameter, laid out in a grid pattern. The grid of LSR strands are laid out to leave multiple square or rectangular openings between LSR strands, with each opening measuring approximately $\frac{5}{8}^{th}$ (five-eighths) inches by $\frac{5}{8}^{th}$ (five-eighths) inches. The LSR grid is also laid out with a somewhat semi-circular toe-end, an opposite linear rear end for paw insertion, and parallel linear sides. The bottom portion of the boot measures approximately 5¼ (five and one-quarter) inches in length from toe-end to rear end, and is approximately 4 (four) inches wide. A strap approximately 1 (one) inch wide and 10 (ten) inches long, is attached to the rear end of the bottom portion of the boot at a 90 (ninety) degree angle to one side of the boot.

A top portion of the boot is fused to the bottom portion of the boot at the toe-end and the sides. The top portion is not fused to the bottom portion at the rear end of the boot, leaving an opening for insertion of the animal's paw. In the preferred embodiment the top portion of the boot is approximately one inch longer at the rear end than the bottom portion. In the preferred embodiment the top portion and bottom portion and strap are all made of LSR grid similar to the LSR grid from which the bottom portion is comprised. In the preferred embodiment the top portion and bottom portion and strap are all manufactured via injection molding, thereby creating all the two portions and strap simultaneously and without seams. In the preferred embodiment the strap comprises an LSR grid that has smaller grid openings to allow for more LSR strands and less open space, thereby increasing the strength of the strap.

In the preferred embodiment the strap includes a section of hook and loop fastener along the length of the loose end of the strap. The mate sections of hook and loop fastener are attached along the length of the rear of the top portion near the edge and under the rear edge and along the length of the bottom portion of the boot. After the animal's paw is inserted into the boot the strap is looped over the top of the animal's ankle, over the rear portion of the top of the boot and attached to the top mate section of the hook and loop fastener, and under the rear of the boot, and attached to the bottom mate section of hook and loop fastener. When the boot strap is positioned to secure the boot to the animal's paw, the linear end of the top portion of the boot will be pressed below the strap to help secure the boot to the foot and to minimize forward drift of the boot while on the foot when walking.

More specifically, in the preferred embodiment the strap portion of the boot measures approximately one inch wide by approximately ten inches, and consists of three sections. The first section being approximately four inches in length and being fused with the rear end of the bottom portion of the boot. The strap consists of a solid LSR or similar thermoplastic elastomer. A hook and loop fastener measuring approximately 3½ inches in length by approximately ½ inch wide is centered and attached to the bottom side of the strap during the injection molding process, giving an overall thickness of approximately ⅜ inch. The second section of the strap is approximately 2½ inches long and is fused with the first section of the strap, but is not directly attached to the body of the boot. The second section of the strap consists of an LSR grid that has smaller grid openings than the body of the boot to allow for more LSR strands and less open space, thereby increasing the strength of the strap. The third section of the strap is fused with the second section of the strap at the end most distal to the first section. The third section of strap is approximately 3½ inches in length and consists of solid LSR or similar material. The third section of strap includes a portion of hook and loop fastener measuring 3 inches by ½ inches, centered at one end of the strap and fused to the strap during the injection molding process.

An overboot is also provided for temporary protection of the animal's paw and protection of the non-slip therapeutic boot disclosed above. The overboot temporarily protects the animal's paw from hot, cold, or abrasive surfaces.

The overboot consists of a light weight or medium weight nylon upper bonded to a silicone rubber sole. The overboot is large enough to easily slip over the animal's paw as well as over the therapeutic boot disclosed above. In alternate embodiments the overboot covers several inches of the animal's leg above the ankle. The overboot provides excess material on the top portion of the overboot. The excess material folds across the top of the animal's paw, ankle, and lower leg. Folding the excess material creates an exterior shape of the overboot that conforms to the shape of the animal's paw, ankle, and lower leg. The overboot also includes two straps, one located at the rear of the overboot, and the other proximal to the animal's ankle. The straps wrap around the exterior of the overboot and are secured with hook and loop fasteners.

In one alternate embodiment elastic cords and cord locks are utilized in place of the hook and loop fasteners to secure the rear of the overboot to the animal's ankle. In another embodiment rigid cordage is utilized to secure the rear of the overboot to the animal's ankle.

In alternate embodiments the overboot may be formed using Tyvek or Gore-Tex.

In another alternate embodiment the sole of the overboot comprises rubber or silicone rubber.

It is to be understood that both the foregoing general description and the following detailed description provide embodiments of the invention and are intended to provide an overview or framework of understanding the nature and character of the invention as it is claimed.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENT

The present invention, which is described more fully hereinafter, provides a therapeutic pet boot for therapeutically increasing traction, providing shock absorption, increasing sensitivity, increasing breathability, increasing ability to visually inspect the animal's foot while the boot is on, and improving ease of placing the boot on the animal. This invention may be embodied in many different forms and should not be construed as limited to the specific embodiments described herein.

Referring to FIGS. 1, 2, 3, and 4, the preferred embodiment of the boot has a top section and a bottom section attached to each other on three sides at the edge of the top and bottom sections. Each section is made of LSR strands approximately ⅛ inch in diameter. The sections are manufactured via injection molding thereby creating all the two portions and strap simultaneously and without seams. The top and bottom sections of the boot are fused at the semi-circular end of the sections, and on the sides. The semi-circular end is the toe end of the boot. In the preferred embodiment the top section of the boot is approximately one inch longer at the rear end than the bottom section.

The top and bottom sections of the boot are not attached to each other at the rear end of the boot, thereby creating an opening for the animal's paw. The toes of the animal are slipped into this opening and the boot is slid up the animal's foot until the animal's toes reach the toe-end of the boot.

In the preferred embodiment the LSR strands are laid out in a grid, thereby creating cells between the LSR strands. Each cell is approximately ⅝ inches square for the extra large size boot. The cells are open to allow air flow through the LSR strands.

In the preferred embodiment the bottom section of the boot is approximately one inch shorter than the top section of the boot, at the rear end of the boot. A strap is attached to the bottom section of the boot extending approximately ten inches at a right angle from one side of the boot at the rear of the boot. The strap is attached along the length of the rear end of the bottom section of the boot and extends outward perpendicularly, giving an overall strap length of about ten inches. The strap includes a section of hook and loop fastener attached along the length of the loose end of the strap. Another section of hook and loop fastener is attached to the top rear of the top section of the boot. Another section of hook and loop fastener is attached to the bottom of the boot at the rear of the bottom section of the boot. After the boot has been placed on the animal's foot the strap is wrapped around the top of the animal's ankle, over the rear portion of the top of the boot, and under the rear of the boot, allowing all of the sections of hook and loop fasteners to secure the boot on the animal's foot. In alternate embodiments any known adjustable fasteners for straps are used.

Figure 1:
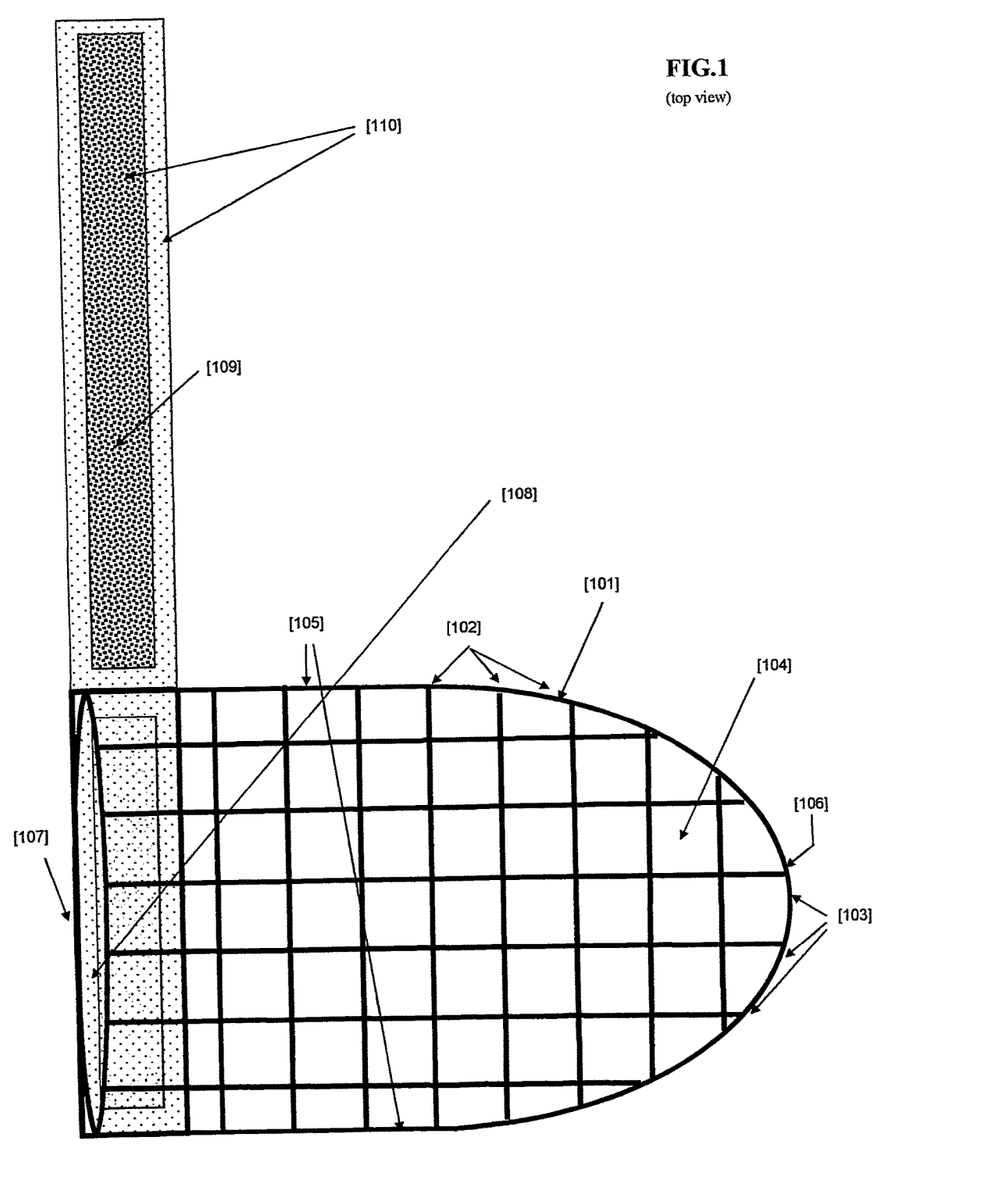
FIG. 1 is a top view of an embodiment of the boot with the strap unfastened.

Referring to FIG. 1, which is a top view of the inventive boot, the top portion of the boot [101] comprises a grid of flexible LSR strands made up of a first set of LSR strands [102] set in parallel to each other approximately ⅝ inches apart, and a second set of LSR strands [103] also in parallel to each other, but set at right angles to the first set of LSR strands. This arrangement leaves multiple square cells [104] of empty space between the LSR strands. The cells [104] allow for relatively free air flow between the animal's paw and the outside of the boot. The cells [104] also allow for visual inspection of the animal's paw without removing the boot. The cells [104] also allow foreign objects, such as dirt or small rocks, to exit the boot through normal movement of the animal, without removing the boot.

A bottom portion of the boot, made of similarly arranged LSR grid, is attached to the top portion along the edge of both the top and bottom portions of the boot at the parallel sides [105] and at the curved front of the boot [106]. In the preferred embodiment the LSR making up this outer edge [105] and [106] is thicker than the LSR making up the remainder of the top and bottom portions of the boot. The top portion of the boot [101] is not attached to the bottom portion at the rear [107] of the boot, thereby leaving an opening [108] between the two portions for the animal's paw to be placed inside the boot.

At the rear of the boot [107] a strap [109] is attached along the entire length of the rear [107] of the bottom section of the boot, and extends perpendicular to one side [105] of the boot at the edge of the boot. The hook portion [110] of a hook and loop fastener is attached to the strap [109] in an orientation leaving the hook portion [110] of the fastener exposed on the surface of the strap [109]. After the animal's paw is inserted into the opening [108] at the rear [107] of the boot, the strap is wrapped over the rear [107] edge of the top portion of the boot [101] and attaches to the loop portion of the fastener on the top rear portion of the top of the boot and around the bottom portion of the boot to attach to the loop portion of the hook and loop fastener, which is attached to the bottom portion of the boot.

Figure 2:
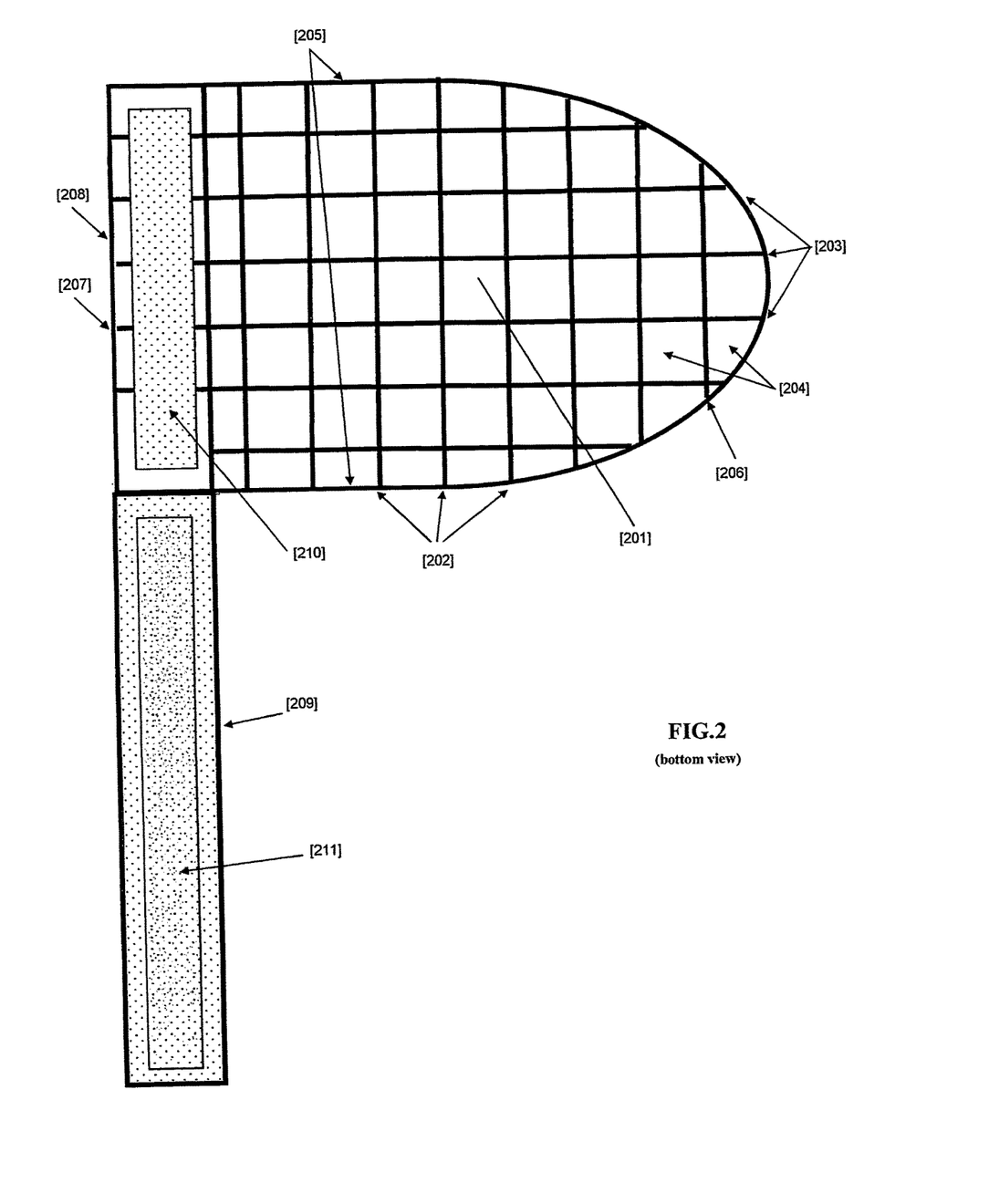
FIG. 2 is a bottom view of the embodiment disclosed in FIG. 1.

Referring to FIG. 2, which is a bottom view of the inventive boot, the bottom portion of the boot [201] comprises a grid of flexible LSR strands made up of a first set of LSR strands [202] set in parallel to each other approximately ⅝ inches apart, and a second set of LSR strands [203] also in parallel to each other, but set at right angles to the first set of LSR strands. As with the top portion of the boot [101] this arrangement leaves multiple square cells of empty space between the LSR strands [204].

A cross section of the LSR strands [202] and [203] reveals that they are approximately ⅛ inches in diameter and that the cross section is slightly oval shaped with the flatter portions of the LSR arranged to contact the animal's paw and the ground, in order to provide increased comfort under the animal's paw.

The top portion of the boot [101] is attached to the bottom portion [201] along the edge of both the top and bottom portions of the boot at the parallel sides [205] and at the curved front of the boot [206]. The parallel sides [205] and curved front [206] of FIG. 2 correspond to the curved front of the boot [106] and the parallel sides [105] of FIG. 1. In the preferred embodiment the LSR making up this outer edge [205] and [206] is thicker than the LSR making up the remainder of the top and bottom portions of the boot. This outer edge [205] and [206] of FIG. 2 also corresponds to the outer edge [105] and [106] of FIG. 1. The top portion of the boot [201] is not attached to the bottom portion [101] at the rear [207] of the boot, thereby leaving an opening [208] between the two portions for the animal's paw to be placed inside the boot. The opening [208] between the two portions of FIG. 2 corresponds to the opening [108] of FIG. 1.

At the rear of the boot [207] a strap [209] is attached along the entire length of the rear [207] of the bottom section of the boot [201], and extends perpendicular to one side [205] of the boot. The strap [209] corresponds to the strap [109] of FIG. 1. The hook portion [110] of a hook and loop fastener is attached to the strap [109/209] in an orientation leaving the hook portion [110] of the fastener exposed on the surface of the strap [109/209]. The loop portions [210] of the hook and loop fastener are attached to the top portion of the boot at the rear of the boot and are attached to the bottom portion [201] of the boot at the rear [207] of the boot in an orientation to allow it to contact the hook portion [211] of the fastener, which is attached to the strap [109/209]. The hook portion of the fastener in FIG. 2 corresponds to the hook portion of the fastener [110] in FIG. 1. After the animal's paw is inserted into the opening [108/208] at the rear [107/207] of the boot, the strap is wrapped over the rear [107] edge of the top portion of the boot [101] and around the rear [207] edge of the bottom portion [201] of the boot to attach to the hook [110/211] and loop [210] portions of the hook and loop fastener.

Figure 3:
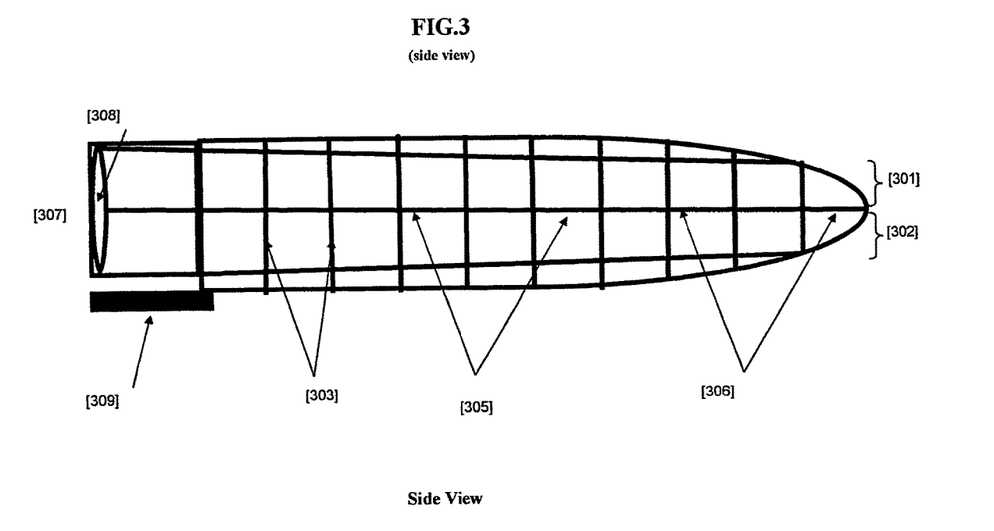
FIG. 3 is a side view of the embodiment disclosed in FIG. 1.

Referring to FIG. 3, which is a side view of the inventive boot, the top portion of the boot [301] and the bottom portion of the boot [302] comprise a grid of flexible LSR strands [303] and multiple square cells [304], as previously described. The top portion [301] corresponds to the top portion [201] from FIG. 2. The bottom portion [302] corresponds to the bottom portion [101] from FIG. 1. The top portion [301] and bottom portion [302] are attached at the edge of both the top and bottom portions of the boot at the parallel sides [305] and at the curved front of the boot [306]. The parallel sides [305] and curved front [306] of FIG. 3 correspond to the curved front of the boot [106] and the parallel sides [105] of FIG. 1, and to the curved front of the boot [206] and the parallel sides [205] of FIG. 2. In the preferred embodiment the LSR making up this outer edge [305] and [306] is thicker than the LSR making up the remainder of the top and bottom portions of the boot.

The top portion of the boot [301] is not attached to the bottom portion [302] at the rear [307] of the boot, thereby leaving an opening [308] between the two portions for the animal's paw to be placed inside the boot. The opening [308] between the two portions of FIG. 3 corresponds to the opening [108] of FIG. 1 and the opening [208] of FIG. 2.

At the rear of the boot [307] a strap [309] is attached along the entire length of the rear [307] of the bottom section of the boot [302], and extends perpendicular to one side of the boot. The strap [309] corresponds to the strap [109] of FIG. 1 and to the strap [209] of FIG. 2.

Figure 4:
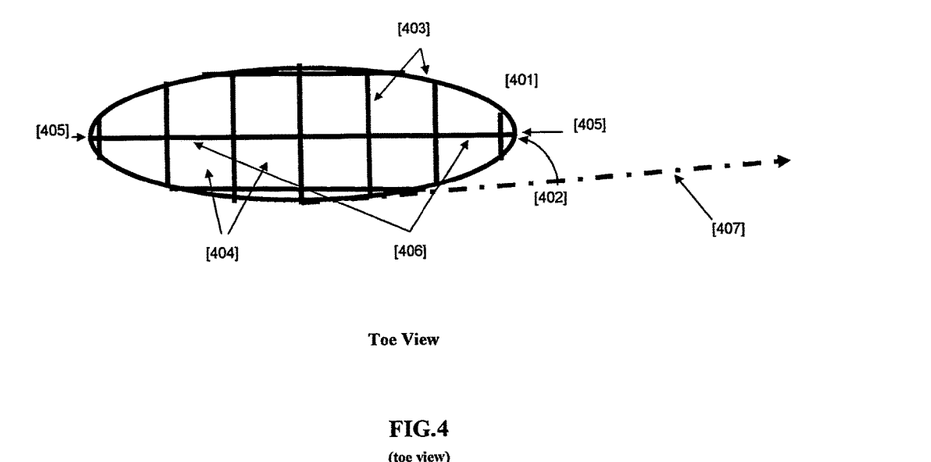
FIG. 4 is a toe view of the embodiment disclosed in FIG. 1.

Referring to FIG. 4, which is a toe view of the inventive boot, the top portion of the boot [401] and the bottom portion of the boot [402] comprise a grid of flexible LSR strands [403] and multiple square cells [404], as previously described. The top portion [401] corresponds to the top portion [201] from FIG. 2, and to the top portion [301] from FIG. 3. The bottom portion [402] corresponds to the bottom portion [101] from FIG. 1 and to the bottom portion [302] from FIG. 3. The top portion [401] and bottom portion [402] are attached at the edge of both the top and bottom portions of the boot at the parallel sides [405] and at the curved front of the boot [406]. A strap [407] is attached is attached along the entire length of the rear of the bottom section of the boot, and extends perpendicular to one side [405] of the boot. The strap [407] corresponds to the strap [109] of FIG. 1 and to the strap [209] of FIG. 2 and to the strap [309] of FIG. 3.

Referring next to FIGS. 5, 6, 7, and 8 the preferred embodiment of the overboot consists of a light-weight nylon upper bonded to a silicone rubber sole. The sole covers the bottom half of the overboot from the toe-end of the overboot, ending half way between the toe end and the rear of the overboot.

The overboot is large enough to easily slip over the animal's paw as well as over the therapeutic boot disclosed above, and to cover several inches of the animal's leg above the ankle. The overboot includes excess material on the top portion of the overboot. The excess material folds across the top of the animal's paw, ankle, and lower leg. Folding the excess material creates an exterior shape of the overboot that conforms to the shape of the animal's paw, ankle, and lower leg. The overboot also includes two straps, the first strap located at the rear of the overboot and the second strap located proximal to the animal's ankle. The straps wrap around the exterior of the overboot and are secured with hook and loop fasteners.

Figure 5:
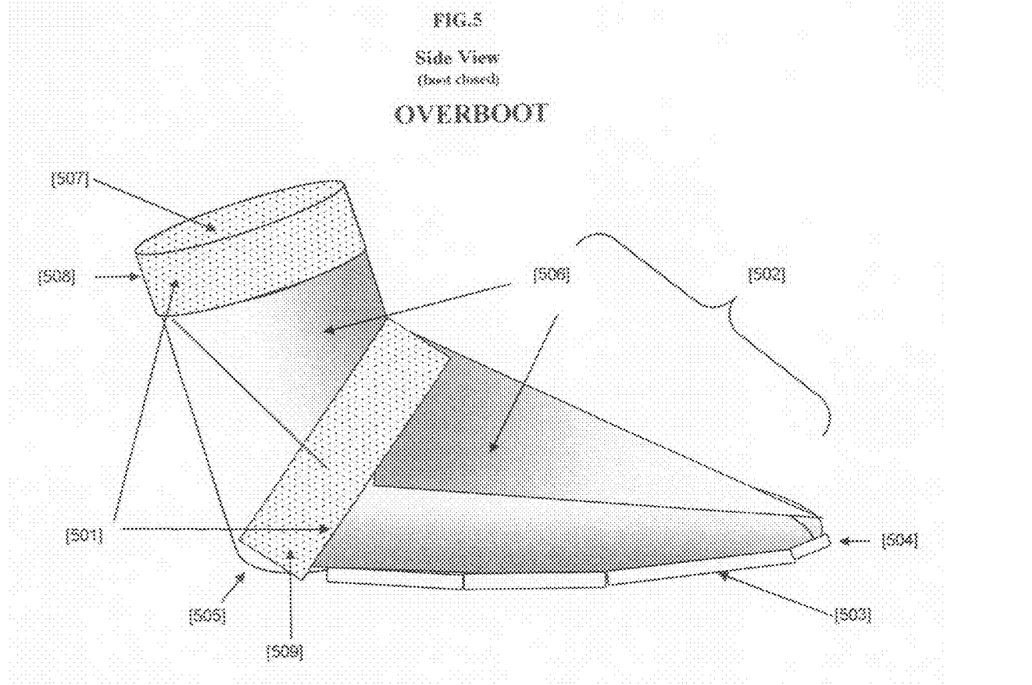
FIG. 5 is a side view of one embodiment of the overboot.

Referring to FIG. 5, which is a side view of the inventive overboot, shown with the hook and loop fasteners [501] in the closed position (fastened) as would be found when the overboot has been placed upon the animal, the overboot includes a light-weight nylon upper [502] bonded to a silicone rubber sole [503]. The sole [503] covers the bottom half of the overboot from the toe-end [504] of the overboot, ending between the toe end [505] and the rear of the overboot.

The overboot is large enough for the rear portion [505] of the nylon upper [502] to cover several inches of the animal's leg above the ankle. The overboot includes excess material on the top portion of the overboot [506], which folds across the top of the animal's paw, ankle, and lower leg. The overboot includes an opening [507] for the animal's paw to be inserted.

The hook and loop fasteners [501] include an upper strap [508] located at the upper rear of the overboot, and a lower strap [509] located proximal to the animal's ankle. After the animal's paw is inserted into the opening [507] of the overboot, the upper strap [508] wraps around the animal's leg at the outer circumference of the opening [507]. The lower strap [509] wraps around the exterior of the overboot at the animal's ankle joint. The upper strap [508] and lower strap [509] include the hook portion of hook and loop fasteners bonded to the straps. The straps wrap around the exterior of the overboot and are secured with loop fasteners which are bonded to the exterior of the overboot.

Figure 6:
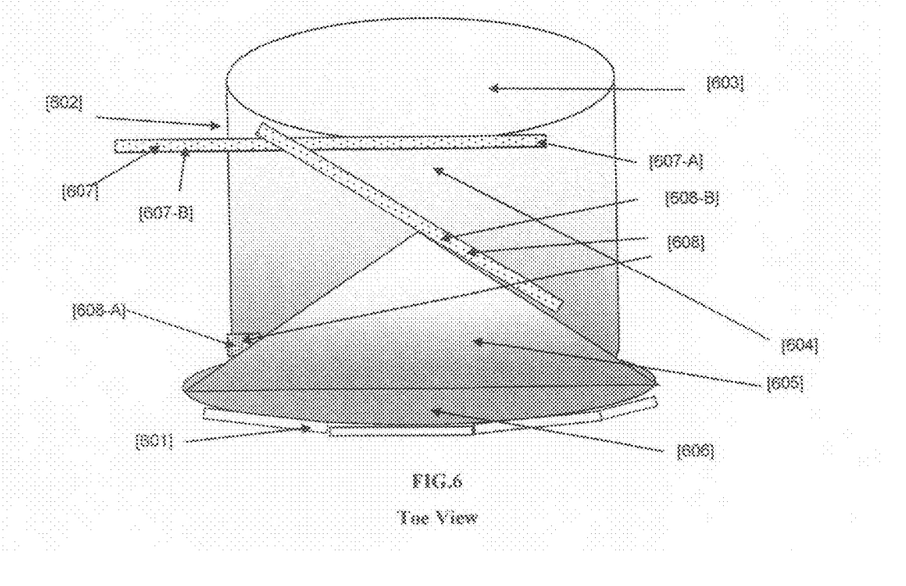
FIG. 6 is a toe view of the embodiment of the overboot disclosed in FIG. 5.

Referring to FIG. 6, which is a toe view, the inventive overboot includes a solid silicone sole [601] bonded to the light weight nylon upper [602], and an opening [603] for insertion of the animal's paw. The sole [601], nylon upper [602], and opening [603] of FIG. 6 correspond to the sole [503], nylon upper [502], and opening [507] of FIG. 5.

The nylon upper [602] includes an upper fold [604] and a lower fold [605]. The lower fold [605] allows the nylon upper [602] to be tightened around the animal's paw at the toe [606]. The upper fold [604] allows the nylon upper [602] to be tightened around the animal's leg at the opening [603].

The overboot also includes an upper strap [607] and a lower strap [608]. The upper strap [607] and a lower strap [608] of FIG. 6 correspond to the upper strap [508] and a lower strap [509] of FIG. 5. One end of the upper strap [607-A] is attached at the front of the upper portion of the nylon upper [602] parallel to the opening [603] and the other end [607-B] extends unattached away from the overboot. After the animal's paw has been inserted the unattached end of the upper strap [607-B] is wrapped around the perimeter of the opening [603], enclosing the animal's paw within the nylon upper [602] and fastened to the attached end of the upper strap [607-A] via hook and loop fasteners bonded to the upper strap [607].

One end of the lower strap [608-A] is attached at approximately the center of the nylon upper [602] approximately where the animal's ankle joint is located, and the other end [608-B] extends unattached away from the overboot. After the animal's paw has been inserted the unattached end [608-B] of the lower strap [608] is wrapped around the outside of the nylon upper [602] at the animal's ankle joint and fastened to the attached end [608-A] of the lower strap [608] via hook and loop fasteners bonded to the lower strap [608].

Figure 7:
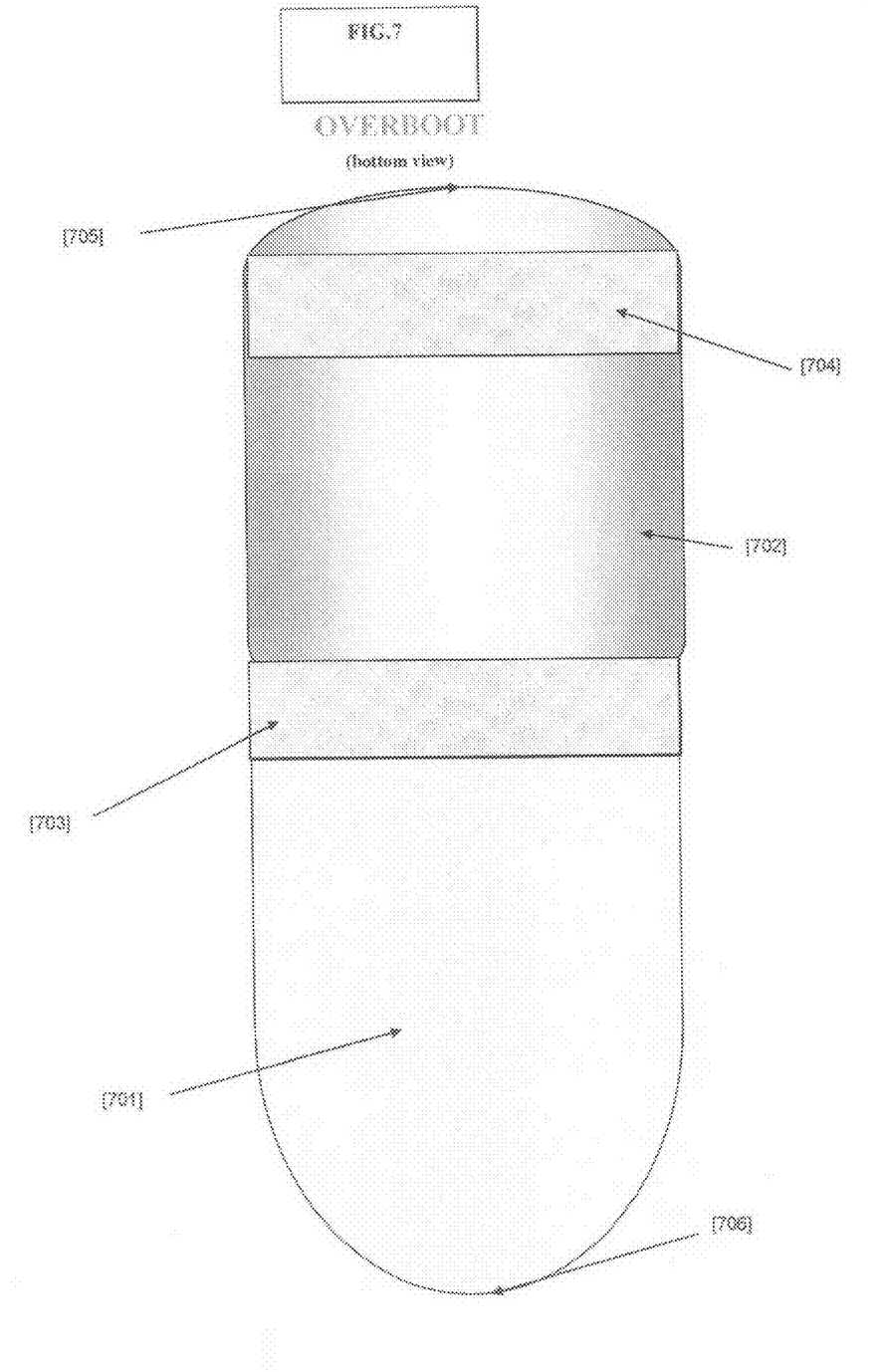
FIG. 7 is a bottom view of the embodiment of the overboot disclosed in FIG. 5.

Referring to FIG. 7, which is a bottom view, the overboot includes a silicone sole [701], a nylon upper [702], a lower strap [703], an upper strap [704], and an opening [705] for the animal's paw. The sole [701], nylon upper [702], lower strap [703], upper strap [704], and opening [705] for the animal's paw of FIG. 7 correspond to the sole [601], nylon upper [602], lower strap [608], upper strap [607], and opening [603] for the animal's paw of FIG. 6, and the sole [503], nylon upper [502], lower strap [509], upper strap [508], and opening [507] for the animal's paw of FIG. 5.

The silicone sole [701] is bonded to the bottom portion of the nylon upper [702] from the toe [706] to the lower strap [703], located at approximately the location of the animal's ankle.

Figure 8:
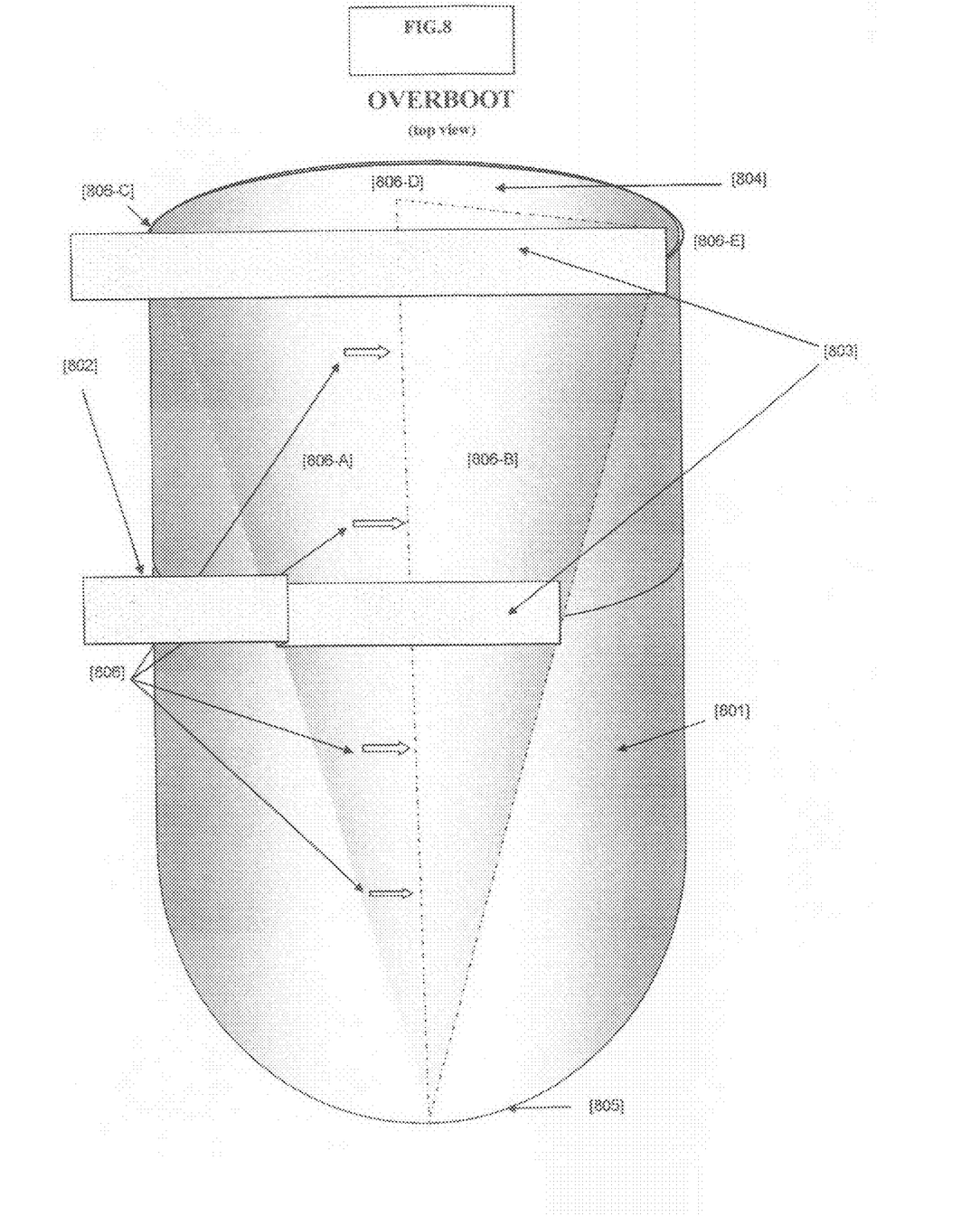
FIG. 8 is a top view of the embodiment of the overboot disclosed in FIG. 5.

Referring to FIG. 8, which is a top view, the overboot includes a nylon upper [801], a lower strap [802], an upper strap [803], an opening [804] for the animal's paw, and a toe [805]. The nylon upper [801], lower strap [802], upper strap [803], opening [804], and toe [805] of FIG. 8 correspond to the nylon upper [702], lower strap [703], upper strap [704], opening [705], and toe [706] of FIG. 7; to the nylon upper [602], lower strap [608], upper strap [607], opening [603], and toe [606] of FIG. 6; and the nylon upper [502], lower strap [509], upper strap [508], opening [507], and toe [504] of FIG. 5.

The overboot also includes excess material [806] in the nylon upper [801] to allow for folding the nylon upper [801] to tighten the overboot around the animal's leg. The excess material [806] of FIG. 8 corresponds to the excess material [506] of FIG. 5. The excess material [806] is divided into an interior section [806-A] and an exterior section [806-B]. The interior section [806-A] is triangular with one side beginning from the toe [805] to one side [806-C] of the opening [804], a second side extending from the side [806-C] to a point [806-D] located approximately halfway between the side [806-C] and a second side [806-E] of the opening [804], and a third side extending from the point [806-D] to the toe [805]. The exterior section [806-B] is also triangular with one side beginning from the toe [805] to the second side [806-E] of the opening [804], a second side extending from the side [806-E] to the point [806-D], and a third side extending from the point [806-D] to the toe [805].

After the animal's leg is inserted into the overboot the exterior section [805B] of the excess material [805] is folded over the interior section [805-A] of the excess material. The upper strap [803] and lower strap [802] are then wrapped around the exterior of the nylon upper [801] and fastened via hook and loop fasteners that are bonded to the upper strap [803] and lower strap [802], thereby securing the animal's paw within the overboot.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A boot for animals having therapeutic properties provided by increased traction on slippery surfaces and allowing for easier control of bodily movements, while maintaining tactile sensitivity between pet paw and walking surface, and improving ability to visually inspect the bottom of an animal's foot while wearing the boot, and increasing animal's tolerance for longer-term use of the boot, consisting of:

more than one strand of thermoplastic elastomer, wherein a cross section of each said strand is oval, and wherein said strands have a cross sectional diameter less than one quarter inch;

a first set of said individual strands of elastomer in parallel with one another wherein said individual strands of said first set are separated by at least one quarter inch;

a second set of individual strands of elastomer also in parallel with one another wherein said individual strands of said second set are separated by at least three-eighths inch, a first grid consisting of said first set of individual strands and said second set of individual strands, wherein said first set of individual strands is oriented approximately ninety degrees in relation to said second set of individual strands, and wherein said individual strands are fused at each intersection of said first set of strands and said second set of strands, and wherein said grids are neither woven nor knitted and therefore do not contain any warp or weft, and wherein said grid thereby creates more than one rectangular cell between said individual strands, wherein said cells have a length of at least one quarter inch, and wherein said cells are empty space which allow air flow through the grid of elastomer, configured to allow visual inspection of a bottom portion of an animal's paw without having to remove said boot by looking through said cells at said bottom portion of said paw;

a second grid identical to said first grid;

a top section consisting of said first grid of thermoplastic elastomer;

a bottom section consisting of said second grid of thermoplastic elastomer, said bottom section permanently fused to said top section;

an edge, said edge consisting of elastomer with a cross sectional diameter thicker than a cross sectional diameter of the individual strands and wherein said edge is the outer edge of the top and bottom sections;

a toe end, said toe end consisting of a curved portion of the edge;

a rear end distal to the toe end;

an opening between the top section and the bottom section at the rear end configured to allow for placement of an animal's appendage;

a strap attached to the bottom section at the rear end.

2. The boot of claim 1 wherein the individual strands of the first grid and the second grid are set at a forty five degree angle from the rear end of the boot, thereby creating diamond shaped grids.

3. The boot of claim 1 wherein multiple said rectangular cells consist of empty spaces.

4. The boot of claim 1 wherein the top and bottom sections consist of a grid of aromatic polyamides.

5. The boot of claim 1 wherein the top and bottom sections consist of a grid of elastomeric plastic netting.

6. The boot of claim 1 wherein the top and bottom sections consist of a grid of flexible filaments.

7. The boot of claim 1 wherein the top and bottom sections consist of a grid of polyamides.

* * * * *

UNITED STATES PATENT AND TRADEMARK OFFICE
CERTIFICATE OF CORRECTION

PATENT NO. : 10,542,729 B2
APPLICATION NO. : 14/120609
DATED : January 28, 2020
INVENTOR(S) : Beth Morris Page 1 of 1

It is certified that error appears in the above-identified patent and that said Letters Patent is hereby corrected as shown below:

On the Title Page

Item (71) and item (72), Loisville, TN should be Louisville, TN

Signed and Sealed this
Fifteenth Day of September, 2020

Andrei Iancu
*Director of the United States Patent and Trademark Office*